(12) United States Patent
Abrue

(10) Patent No.: US 7,286,662 B1
(45) Date of Patent: Oct. 23, 2007

(54) RAPID TELEPHONE CALL METHODS AND SYSTEMS

(75) Inventor: Curtis M. Abrue, Cumming, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 775 days.

(21) Appl. No.: 10/202,163

(22) Filed: Jul. 24, 2002

(51) Int. Cl.
*H04M 1/00* (2006.01)
*H04M 3/00* (2006.01)

(52) U.S. Cl. .................................. 379/355.01
(58) Field of Classification Search ............ 379/355.01
See application file for complete search history.

(56) References Cited

U.S. PATENT DOCUMENTS

| | | | |
|---|---|---|---|
| 5,550,898 A | 8/1996 | McLeod et al. | |
| 5,930,350 A | 7/1999 | Johnson | |
| 6,141,408 A | 10/2000 | Garfinkle | |
| 6,873,861 B2 * | 3/2005 | Awada et al. ............... | 455/566 |
| 2002/0186832 A1 * | 12/2002 | Mani ..................... | 379/355.01 |

* cited by examiner

*Primary Examiner*—Curtis Kuntz
*Assistant Examiner*—Alexander Jamal
(74) *Attorney, Agent, or Firm*—Merchant & Gould

(57) ABSTRACT

Methods and systems for providing rapid telephone call capability to a plurality of callers, the methods and systems including receiving a selection by a first party of a first code, wherein the first code is between two (2) and seven (7) characters in length, and receiving a selection by a second party of a second code, wherein the second code is between two (2) and seven (7) characters in length, and wherein the second code is different in length than the first code. The methods and systems for providing rapid telephone call capability to a plurality of callers also including storing the first code in association with a first telephone number and storing the second code in association with a second telephone number. The methods and systems for providing rapid telephone call capability to a plurality of callers further including receiving a dialed code from a caller, wherein the dialed code is between two (2) and seven (7) characters in length. If the dialed code consists of the first code, the methods and systems include connecting the caller with the first telephone number, and if the dialed code consists of the second code, the methods and systems include connecting the caller with the second telephone number.

24 Claims, 6 Drawing Sheets

RAPID TELEPHONE CALL METHODS AND SYSTEMS

FIELD OF THE INVENTION

The present invention relates generally to telecommunications methods and systems. More specifically, the present invention relates to rapid telephone call methods and systems.

BACKGROUND OF THE INVENTION

A number of conventional rapid telephone call methods and systems are currently available to telephone services customers and/or callers. These conventional rapid telephone call methods and systems allow the telephone services customers and/or callers to select and/or dial an abbreviated and/or customized telephone number to reach a given party, as opposed to a full ten (10) -digit and/or non-customized telephone number. In other words, the conventional rapid telephone call methods and systems make it relatively easy for the callers to reach the party.

For example, conventional "N11" service allows emergency service organizations, public service organizations, telephone repair services, telephone information services, and the like to reserve and utilize a three (3)-digit telephone number, such as "911," "211," "611," and "411," which is provided to their users and/or customers. The users and/or customers may then dial this 3-digit number, with the "11" acting as an alert code, to reach the associated emergency service organization, public service organization, telephone repair service, or telephone information service relatively quickly and easily. Advantageously, such abbreviated telephone numbers are relatively easy to remember and may be marketed to the public at large.

Conventional network-based speed-call services allow telephone services customers to associate a two (2) or three (3)-digit telephone number, including an alert character, with a full ten (10)-digit telephone number. For example, a telephone services customer may, via their telephone services provider, associate "*5" or "*55" with their full "(555) 555-5555" telephone number. This service is typically utilized by news stations and the like to make it relatively easy for their listeners or viewers to report breaking news and events, such as traffic accidents. Likewise, other conventional network-based speed-call services, such as BellSouth's TouchStar service (BellSouth Corp., Atlanta, Ga.), associate a two (2) or three (3)-digit telephone number, also including an alert character, with a full ten (10)-digit telephone number, allowing a telephone services customer and/or caller to access a given telephone service. For example, a telephone services caller may access a repeat dialing service by dialing "*69". Again, such abbreviated telephone numbers are relatively easy to remember and may be marketed to the public at large.

Conventional toll-free services provided by most inter-exchange carriers (IXCs) and competitive local-exchange carriers (CLECs) allow telephone services customers to reserve and/or utilize a customized full ten (10)-digit telephone number, such as "(800) ABC-DEFG," which is provided to their users and/or customers. These users and/or customers may then dial this customized 10-digit telephone number to reach the associated full, non-customized 10-digit telephone number and a given telephone services customer. The "800" portion of the customized 10-digit telephone number indicates that charges associated with the telephone call will be paid by the telephone services customer, and not the telephone services caller. Advantageously, such customized, toll-free telephone numbers are relatively easy to remember and may be marketed to the public at large.

What is still needed, however, are rapid telephone call methods and systems that are more flexible and that allow a telephone services customer and/or caller to reserve and utilize and/or dial an abbreviated and/or customized two (2) to seven (7)-digit telephone number, the 2 to 7-digit telephone number not necessarily including an alert code or character. This 2 to 7-digit telephone number would then be associated by the telephone services provider with a full ten (10)-digit telephone number and the call would be terminated to the associated telephone services customer. Thus, for example, the telephone number "ABC" could be terminated to ABC Company's customer call center and an interactive voice response (IVR) menu. What is also needed is a 2 to 7-digit telephone number that may be selectively enabled/disabled in predetermined geographic areas or Local Access Transport Areas (LATAs), such that the 2 to 7-digit telephone number may be selectively marketed in those predetermined geographic areas.

A plurality of additional telephone call and advanced telephony services could be associated with the rapid telephone call service, including telephone call routing, blocking, and handling services. Such services could include, for example, tailored call coverage services, point of call coverage services, menu routing services, advanced routing services, emergency routing services, agent routing services, blocking services, voice mail services, and the like. A telephone services customer could then be charged for this rapid telephone call service based upon the associated feature-plus-event-driven transaction charges, such as each time a telephone call is routed, blocked, or handled in any way.

BRIEF SUMMARY OF THE INVENTION

Various embodiments of the present invention provide rapid telephone call methods and systems that allow a telephone services customer and/or caller to reserve and utilize and/or dial an abbreviated and/or customized two (2) to seven (7)-digit telephone number. Optionally, the 2 to 7-digit telephone number may include an alert code or character. This 2 to 7-digit telephone number is associated by the telephone services provider with a full ten (10)-digit telephone number and the telephone call is terminated to the associated telephone services customer. Thus, for example, the telephone number "ABC" is terminated to ABC Company's customer call center and an interactive voice response (IVR) menu. Various embodiments of the present invention also provide a 2 to 7-digit telephone number that may be selectively enabled/disabled in predetermined geographic areas or Local Access Transport Areas (LATAs), such that the 2 to 7-digit telephone number may be selectively marketed in those predetermined geographic areas.

In one preferred embodiment of the present invention, a method for providing rapid telephone call capability to a plurality of callers includes receiving a selection by a first party of a first code, wherein the first code is between two (2) and seven (7) characters in length, and receiving a selection by a second party of a second code, wherein the second code is between two (2) and seven (7) characters in length, and wherein the second code is different in length than the first code. The method for providing rapid telephone call capability to a plurality of callers also includes storing the first code in association with a first telephone number and storing the second code in association with a second telephone number. The method for providing rapid telephone call capability to a plurality of callers further includes receiving a dialed code from a caller, wherein the dialed code is between two (2) and seven (7) characters in length. If the dialed code consists of the first code, the method includes connecting the caller with the first telephone number, and if the dialed code consists of the second code, the method includes connecting the caller with the second telephone number.

In another preferred embodiment of the present invention, a system operable for providing rapid telephone call capability to a plurality of callers includes means for receiving a selection by a first party of a first code, wherein the first code is between two (2) and seven (7) characters in length, and means for receiving a selection by a second party of a second code, wherein the second code is between two (2) and seven (7) characters in length, and wherein the second code is different in length than the first code. The system operable for providing rapid telephone call capability to a plurality of callers also includes a database operable for storing the first code in association with a first telephone number and the second code in association with a second telephone number. The system operable for providing rapid telephone call capability to a plurality of callers further includes a telephone network operable for transmitting a dialed code from a caller, wherein the dialed code is between two (2) and seven (7) characters in length. Finally, the system operable for providing rapid telephone call capability to a plurality of callers includes an algorithm operable for connecting the caller with the first telephone number if the dialed code consists of the first code and connecting the caller with the second telephone number if the dialed code consists of the second code.

Advantageously, a plurality of additional telephone call and advanced telephony services are associated with the rapid telephone call service, including telephone call routing, blocking, and handling services. Such services include, for example, tailored call coverage services, point of call coverage services, menu routing services, advanced routing services, emergency routing services, agent routing services, blocking services, voice mail services, and the like. A telephone services customer is then charged for this rapid telephone call service based upon the associated feature-plus-event-driven transaction charges, such as each time a telephone call is routed, blocked, or handled in any way. A telephone services provider benefits from the rapid telephone call service through increased revenue and enhanced brand recognition.

DETAILED DESCRIPTION OF THE INVENTION

Embodiments of the present invention include methods and systems for providing rapid telephone call capability. FIGS. 1-6 show exemplary embodiments of these methods and systems.

Figure 1:
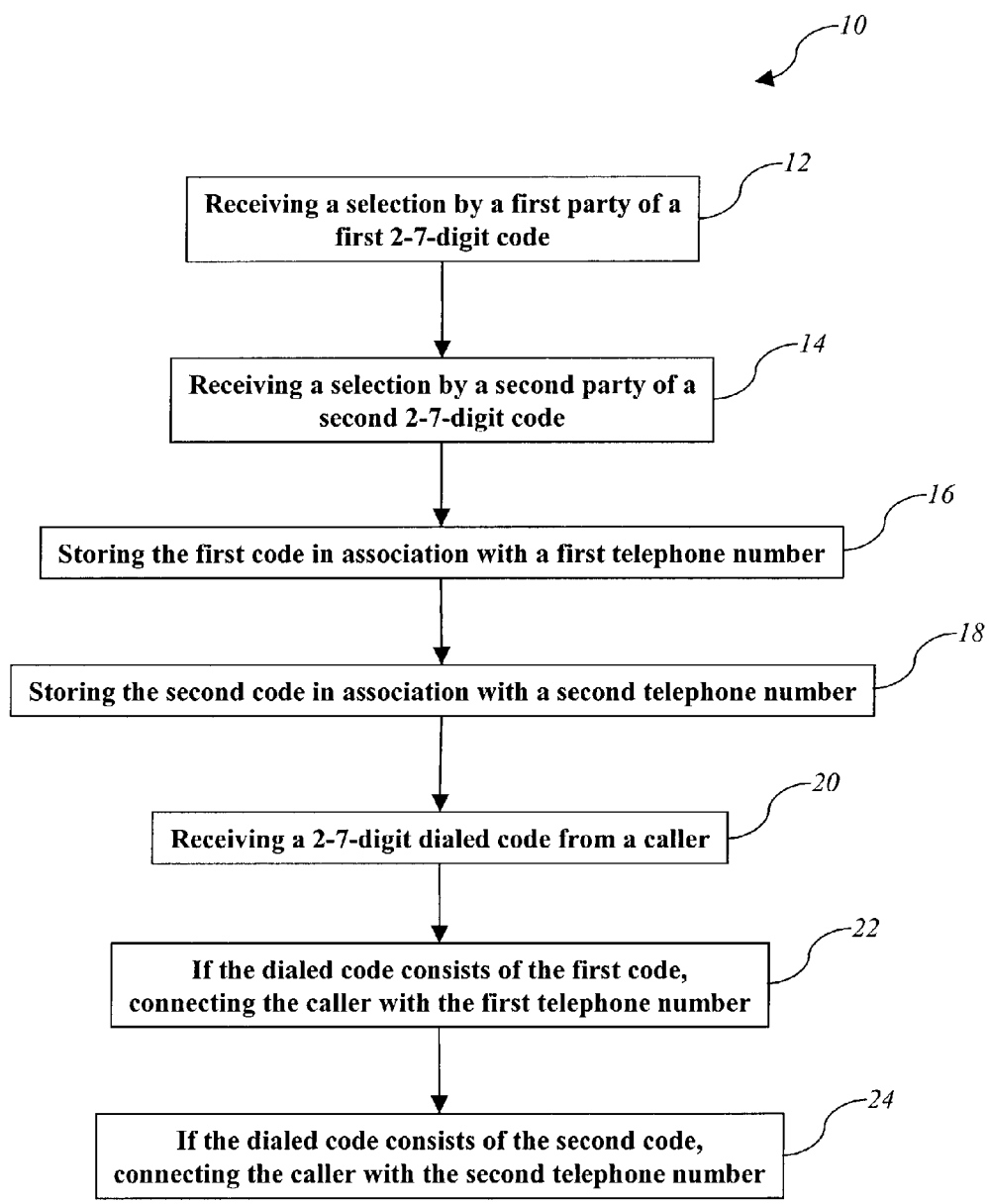
FIG. 1 is a flow chart of one embodiment of the method for providing rapid telephone call capability to a plurality of callers of the present invention.

Referring to FIG. 1, in one embodiment of the present invention, a method 10 for providing rapid telephone call capability to a plurality of callers includes receiving a selection by a first party of a first code (Block 12), wherein the first code is between two (2) and seven (7) characters in length, and receiving a selection by a second party of a second code (Block 14), wherein the second code is between two (2) and seven (7) characters in length. Optionally, the second code is different in length than the first code. For example, a telephone services provider may receive a request for the three (3) or four (4)-digit telephone number "ABC", "ABC1", or "*ABC" from ABC Company and the four (4) or five (5)-digit telephone number "DEFG", "DEFG1", or "*DEFG" from DEFG Company. These telephone numbers are advantageous to ABC Company and DEFG Company as such abbreviated and/or customized telephone numbers are relatively easy to remember and may be marketed to the public at large. The requests from ABC Company and DEFG Company may be received via telephone calls from ABC Company and DEFG Company transmitted to the telephone services provider utilizing a public-switched telephone network (PSTN), telephone calls from ABC Company and DEFG Company transmitted to the telephone services provider utilizing a wireless network, via the Internet, or the like.

The method 10 for providing rapid telephone call capability to a plurality of callers also includes storing the first code in association with a first telephone number (Block 16) and storing the second code in association with a second telephone number (Block 18). For example, the abbreviated and/or customized telephone number "ABC", "ABC1", or "*ABC" may be associated with the full ten (10)-digit telephone number "(555) 555-5551" and the abbreviated and/or customized telephone number "DEFG", "DEFG1", or "*DEFG" may be associated with the full ten (10)-digit telephone number "(555) 555-5552". These abbreviated and/or customized and full 10-digit telephone numbers are preferably stored in one or more telephone services provider databases which are in communication with one another. Preferably, the one or more telephone services provider databases reside in the telephone services provider's network, such as in an Advanced Intelligent Network (AIN), or in a globally-distributed computer network.

The method 10 for providing rapid telephone call capability to a plurality of callers further includes receiving a dialed code from a caller (Block 20), wherein the dialed code is between two (2) and seven (7) characters in length. This dialed code may be transmitted from the caller to the telephone services provider via a wireline device and the PSTN, via a wireless device and the wireless network, via an Internet-protocol (IP) device and the Internet, or the like. If the dialed code consists of the first code, the method 10 includes connecting the caller with the first telephone number (Block 22), and if the dialed code consists of the second code, the method 10 includes connecting the caller with the second telephone number (Block 24). Thus, for example, the abbreviated and/or customized telephone number "ABC", "ABC1", or "*ABC" is terminated to ABC Company's customer call center and an interactive voice response (IVR) menu. Likewise, the abbreviated and/or customized telephone number "DEFG", "DEFG1", or "*DEFG" is terminated to DEFG Company's call center and an IVR menu.

Figure 2:
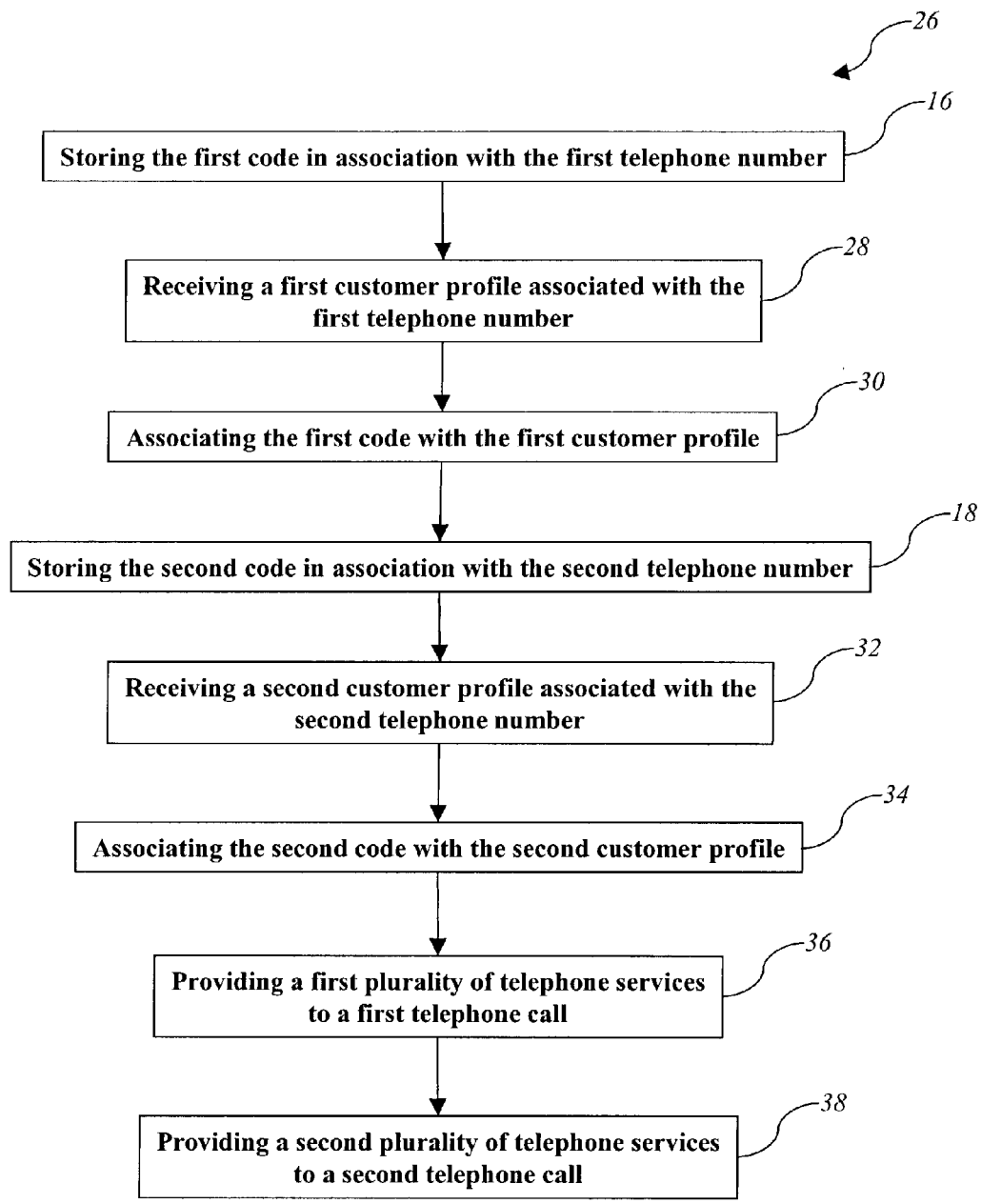
FIG. 2 is a flow chart of another embodiment of the method for providing rapid telephone call capability to a plurality of callers of the present invention.

Referring to FIG. 2, in another embodiment of the present invention, the method 26 for providing rapid telephone call capability to a plurality of callers includes, following storing the first code in association with the first telephone number (Block 16), receiving a first customer profile associated with the first telephone number (Block 28). The method 26 for providing rapid telephone call capability to a plurality of callers also includes, following storing the second code in association with the second telephone number (Block 18), receiving a second customer profile associated with the second telephone number (Block 32). The first and second customer profiles include information related to the customers' telephone services preferences, i.e., which services the customers would like provided to their respective telephone numbers. Optionally, the first and second customer profiles may be stored in a telephone services provider customer profile database in communication with other telephone services provider databases. Preferably, the telephone services provider customer profile database resides in the telephone services provider's network, such as in the AIN, or in the globally-distributed computer network.

The method 26 for providing rapid telephone call capability to a plurality of customers further includes associating the first code with the first customer profile (Block 30) and associating the second code with the second customer profile (Block 34). Thus, when the telephone services provider receives a dialed code from a caller (Block 20) (FIG. 1), a first plurality of telephone services are provided to a first telephone call terminated to the first telephone number (Block 36) and a second plurality of telephone services are provided to a second telephone call terminated to the second telephone number (Block 38). These services may include, for example, telephone call routing, blocking, and handling services, such as tailored call coverage services, point of call coverage services, menu routing services, advanced routing services, emergency routing services, agent routing services, blocking services, voice mail services, and the like. A telephone services customer is charged for this rapid telephone call service based upon the associated feature-plus-event-driven transaction charges, such as each time a telephone call is routed, blocked, or handled in any way.

Figure 3:
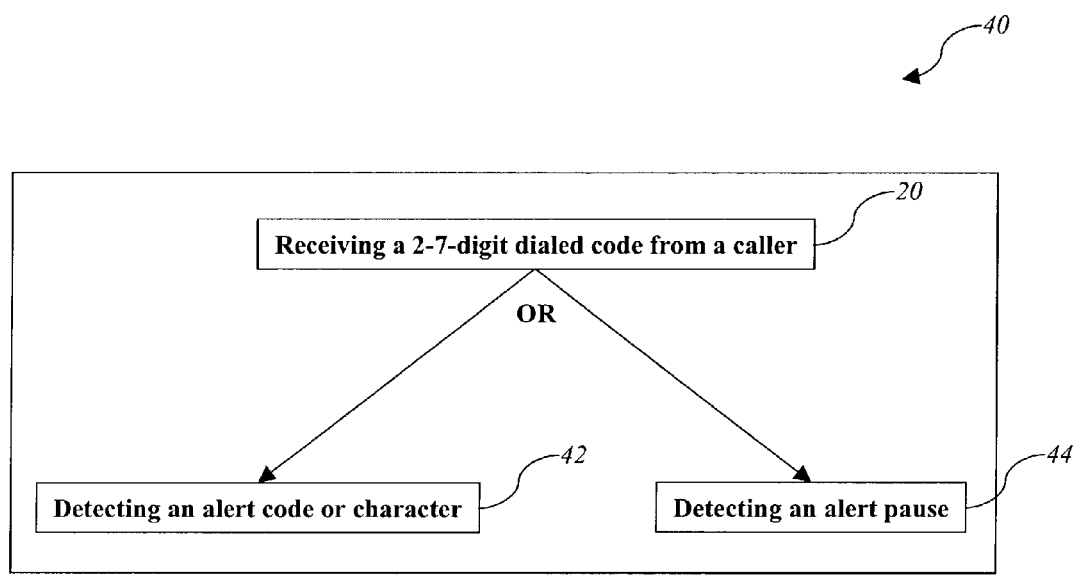
FIG. 3 is a flow chart of a further embodiment of the method for providing rapid telephone call capability to a plurality of callers of the present invention.

Referring to FIG. 3, in a further embodiment of the present invention, the method 40 for providing rapid telephone call capability to a plurality of callers includes, following receiving a two (2) to seven (7)-digit dialed code from a caller (Block 20), detecting an alert code or character embedded in the dialed code (Block 42) or detecting an alert pause following the dialed code (Block 44). This step is useful because conventional telephone services providers' systems are configured to recognize and handle full ten (10)-digit telephone numbers. A dialed code having less than 10-digits would typically be treated as an incomplete telephone number. An alert code, character, or pause (of 3-5 seconds, for example) indicates to the systems that a complete abbreviated and/or customized telephone number has been entered. The alert code or character may be, for example, a predetermined combination/sequence of alpha-numeric characters or a special character, such as a "*". Once the pause or alert code is detected, the system may immediately connect the call. In one embodiment, the system detects the pause or alert code and then plays a recording requesting a password, confirmation, or other code or input from the user.

Figure 4:
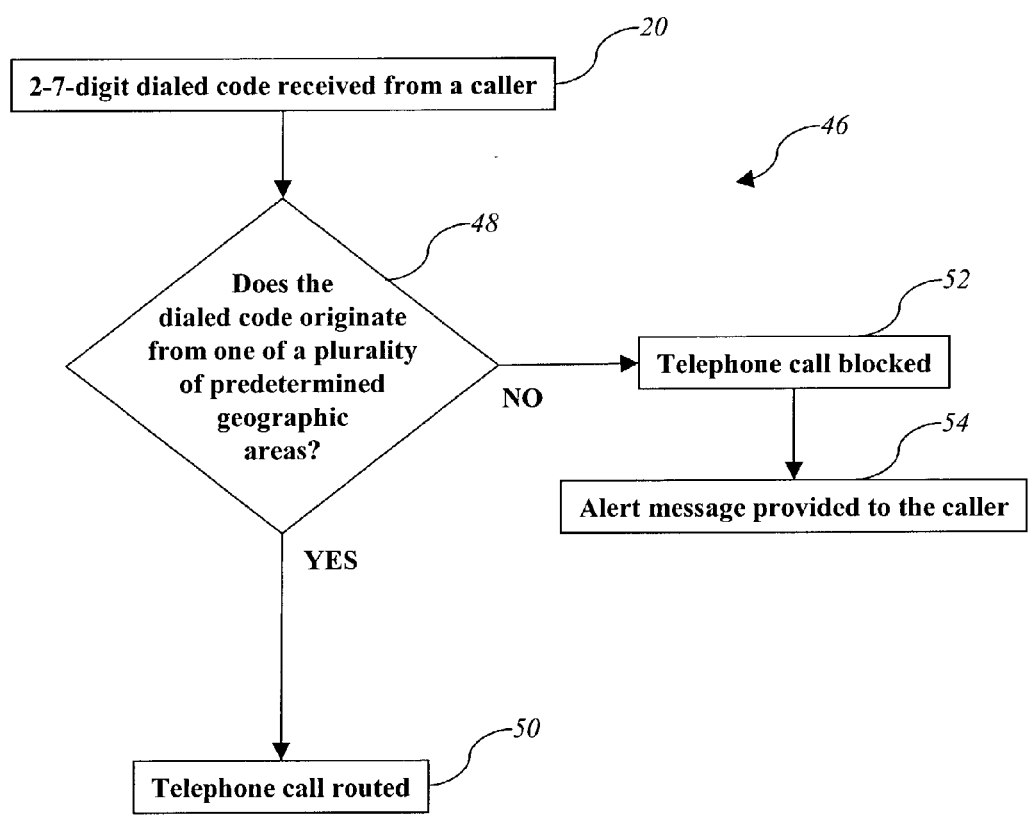
FIG. 4 is a flow chart of a further embodiment of the method for providing rapid telephone call capability to a plurality of callers of the present invention.

Referring to FIG. 4, in a further embodiment of the present invention, the method 46 for providing rapid telephone call capability to a plurality of callers includes, following receiving a two (2) to seven (7)-digit dialed code from a caller (Block 20), determining whether or not the dialed code originated from one of a plurality of predetermined geographic areas (Block 48). If the answer is "yes," then the telephone call associated with the dialed code is routed. (Block 50). If the answer is "no," then the telephone call associated with the dialed code is blocked. (Block 52). Optionally, in the event that the telephone call associated with the dialed code is blocked, an appropriate alert message may be provided to the caller (Block 54). Whether or not the dialed code originated from one of the plurality of predetermined geographic areas may be determined in a variety of ways. For example, the system may utilize the known location of the wireline device from which the telephone call originated, the area code of the wireline or wireless device from which the telephone call originated, or global positioning system (GPS) data related to the location of the wireless device from which the telephone call originated. Thus, an abbreviated and/or customized two (2) to seven (7)-digit telephone number may be selectively enabled/disabled in predetermined geographic areas or Local Access Transport Areas (LATAs), such that the 2 to 7-digit telephone number may be selectively marketed in those predetermined geographic areas.

Figure 5:
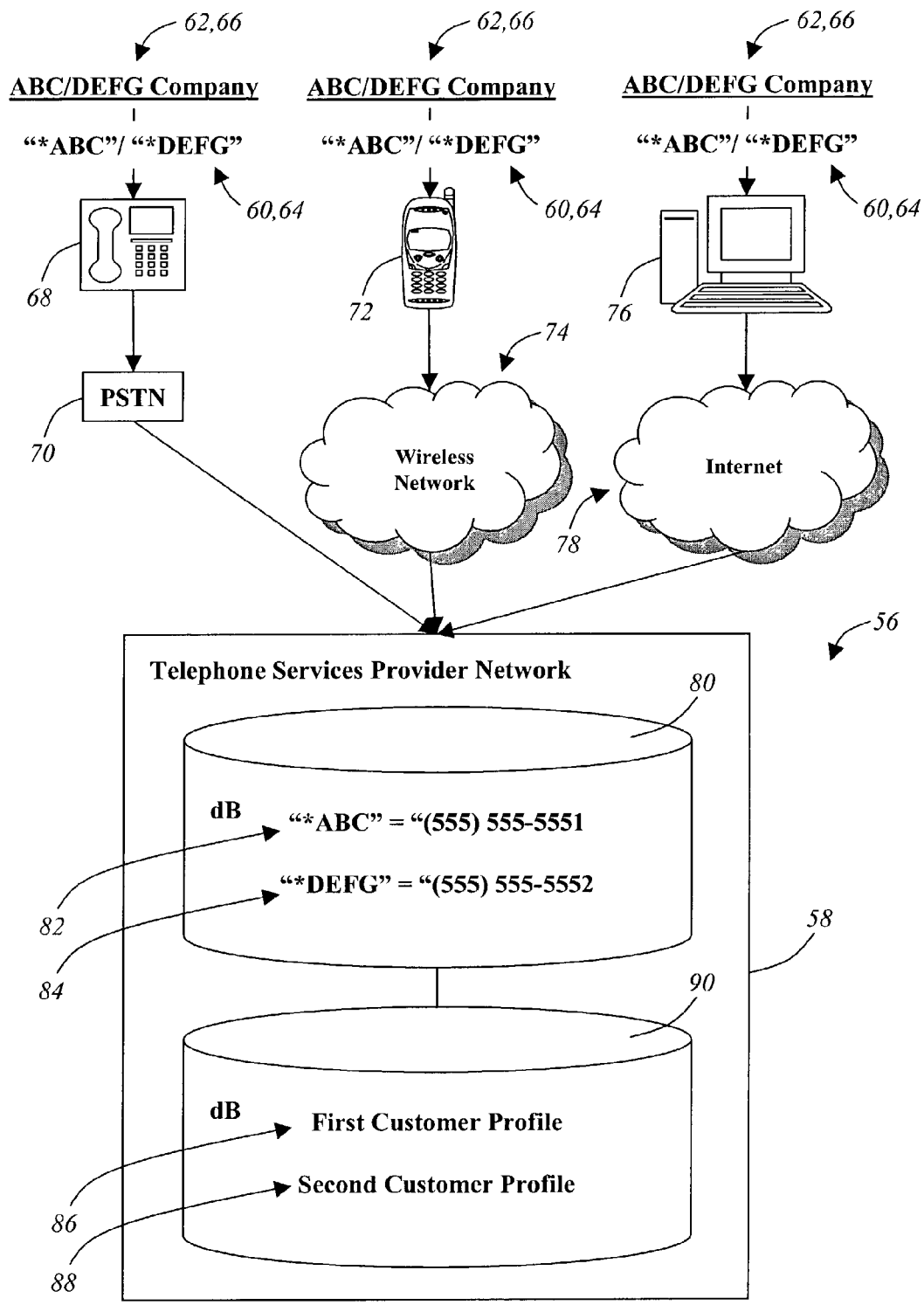
FIG. 5 is a schematic diagram of one embodiment of the system operable for providing rapid telephone call capability to a plurality of callers of the present invention.

Referring to FIG. 5, in one embodiment of the present invention, a system 56 operable for providing rapid telephone call capability to a plurality of callers includes means for receiving a selection by a first party of a first code, wherein the first code is between two (2) and seven (7) characters in length, and receiving a selection by a second party of a second code, wherein the second code is between two (2) and seven (7) characters in length, and wherein the second code is different in length than the first code. For example, an element (not shown) in a telephone services provider network 58, such as a media gateway controller or service control point (SCP), may receive a request for the three (3) or four (4)-digit telephone number "ABC", "ABC1", or "*ABC" ("*ABC" 60 is shown in FIG. 5) from ABC Company 62 and the four (4) or five (5)-digit telephone number "DEFG", "DEFG1", or "*DEFG" ("*DEFG" 64 is shown in FIG. 5) from DEFG Company 66. These telephone numbers 60, 64 are advantageous to ABC Company 62 and DEFG Company 66 as such abbreviated and/or customized telephone numbers are relatively easy to remember and may be marketed to the public at large. The requests from ABC Company 62 and DEFG Company 66 may be received via telephone calls from ABC Company 62 and DEFG Company 66 transmitted to the telephone services provider network 58 utilizing a wireline device 68 and a public-switched telephone network (PSTN) 70, telephone calls from ABC Company 62 and DEFG Company 66 transmitted to the telephone services provider network 58 utilizing a wireless device 72 and a wireless network 74, via a personal computer/laptop computer/personal digital assistant 76 and the Internet 78 or another globally-distributed computer network, or the like.

The system 56 operable for providing rapid telephone call capability to a plurality of callers also includes one or more telephone services provider databases 80 operable for storing the first code in association with a first telephone number and storing the second code in association with a second telephone number. For example, the abbreviated and/or customized telephone number "*ABC" 60 may be associated with the full ten (10)-digit telephone number "(555) 555-5551" 82 and the abbreviated and/or customized telephone number "*DEFG" 66 may be associated with the full ten (10)-digit telephone number "(555) 555-5552".

In another embodiment of the present invention, the system 56 operable for providing rapid telephone call capability to a plurality of callers includes, in addition to a first algorithm operable for storing the first code in association with the first telephone number, means for receiving a first customer profile 86 associated with the first telephone number, such as an SCP or media gateway controller or other element of the service provider's network. The system 56 operable for providing rapid telephone call capability to a plurality of callers also includes, in addition to a second algorithm operable for storing the second code in association with the second telephone number, means for receiving a second customer profile 88 associated with the second telephone number. The first and second customer profiles 86,88 include information related to the customers' telephone services preferences, i.e. which services the customers would like provided to their respective telephone numbers. Optionally, the first and second customer profiles 86,88 may be stored in a telephone services provider customer profile database 90 in communication with other telephone services provider databases 80.

The system 56 operable for providing rapid telephone call capability to a plurality of customers further includes a first routine operable for associating the first code with the first customer profile 86 and a second routine operable for associating the second code with the second customer profile 88. Thus, when the telephone services provider network 58 receives a dialed code from a caller, a first plurality of telephone services are provided to a first telephone call terminated to the first telephone number and a second plurality of telephone services are provided to a second telephone call terminated to the second telephone number. These services may include, for example, telephone call routing, blocking, and handling services, such as tailored call coverage services, point of call coverage services, menu routing services, advanced routing services, emergency routing services, agent routing services, blocking services, voice mail services, and the like. A telephone services customer is charged for this rapid telephone call service based upon the associated feature-plus-event-driven transaction charges, such as each time a telephone call is routed, blocked, or handled in any way.

Figure 6:
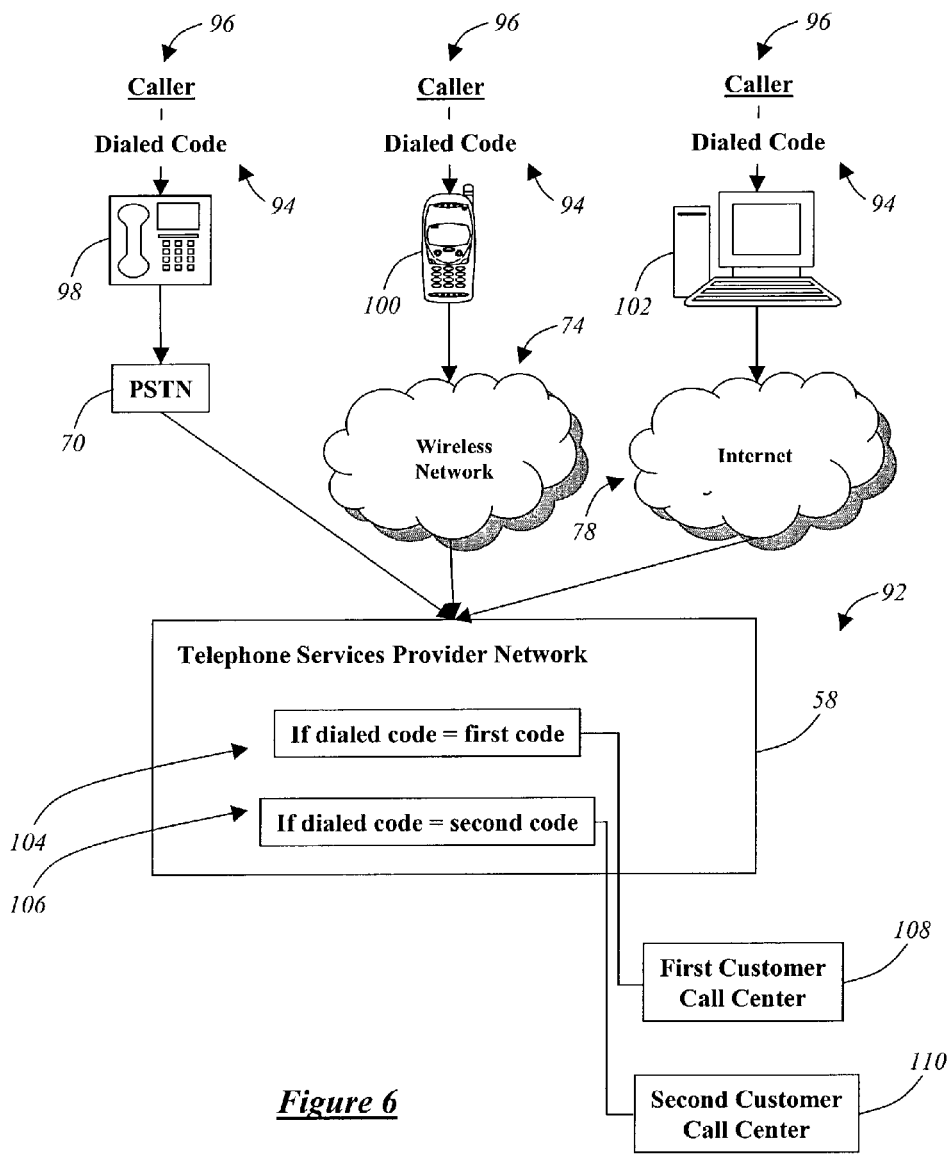
FIG. 6 is a schematic diagram of another embodiment of the system operable for providing rapid telephone call capability to a plurality of callers of the present invention.

Referring to FIG. 6, the system 92 operable for providing rapid telephone call capability to a plurality of callers further includes means for receiving a dialed code 94 from a caller 96, such as a service switching point (SSP) or other device, wherein the dialed code is between two (2) and seven (7) characters in length. This dialed code 94 may be transmitted from the caller 96 to the telephone services provider network 58 via a wireline device 98 and the PSTN 70, via a wireless device 100 and the wireless network 74, via an Internet-protocol (IP) device 102 and the Internet 78 or another globally-distributed computer network, or the like. If the dialed code 94 consists of the first code, the system 92 connects the caller 96 with the first telephone number 104, and if the dialed code 94 consists of the second code, the system 92 connects the caller with the second telephone number 106. In operation, these functions are carried out by a plurality of algorithms. Thus, for example, the abbreviated and/or customized telephone number "ABC", "ABC1", or "*ABC" is terminated to ABC Company's customer call center 108 and an interactive voice response (IVR) menu and the abbreviated and/or customized telephone number "DEFG", "DEFG1", or "*DEFG" is terminated to DEFG Company's call center 110 and an IVR menu.

As described above, the system 92 operable for providing rapid call capability to a plurality of calls also includes logic operable for detecting an alert code or character embedded in the dialed code or detecting an alert pause following the dialed code. This logic is necessary because conventional telephone services providers' systems are configured to recognize and handle full ten (10)-digit telephone numbers. A dialed code having less than 10-digits would typically be treated as an incomplete telephone number. An alert code, character, or pause (of 3-5 seconds, for example) indicates to the system 92 that a complete abbreviated and/or customized telephone number has been entered. The alert code or character may be, for example, a predetermined combination/sequence of alphanumeric characters or a special character, such as a "*".

In a further embodiment of the present invention, the system 92 operable for providing rapid telephone call capability to a plurality of callers includes, in addition to means for receiving a two (2) to seven (7)-digit dialed code from a caller, a blocking algorithm operable for determining whether or not the dialed code originated from one of a plurality of predetermined geographic areas. If the answer is "yes", then the telephone call associated with the dialed code 94 is routed. If the answer is "no", then the telephone call associated with the dialed code 94 is blocked. Optionally, in the event that the telephone call associated with the dialed code 94 is blocked, an appropriate alert message may be provided to the caller 96. Whether or not the dialed code 94 originated from one of the plurality of predetermined geographic areas may be determined utilizing the known location of the wireline device 98 from which the telephone call originated, the area code of the wireline or wireless device 98,100 from which the telephone call originated, or global positioning system (GPS) data related to the location of the wireless device 100 from which the telephone call originated. Thus, an abbreviated and/or customized two (2) to seven (7)-digit telephone number may be selectively enabled/disabled in predetermined geographic areas or Local Access Transport Areas (LATAs), such that the 2 to 7-digit telephone number may be selectively marketed in those predetermined geographic areas.

Although the present invention has been shown and described with reference to preferred embodiments and examples thereof, other embodiments and examples may achieve the same results and/or perform similar functions. Accordingly, changes in and modifications to the present invention will be apparent to those of ordinary skill in the art without departing from the spirit or scope of the present invention. The following claims are intended to cover all such equivalent embodiments and examples.

What is claimed is:

1. A method for providing rapid telephone call capability to a plurality of callers, comprising:
   receiving a request to associate a first code with a telephone number assigned to a first party at an element in a telephone service provider network from the first party, wherein the first code is between two (2) and seven (7) characters in length;
   receiving a request to associate a second code with a telephone number assigned to a second party at an element in the telephone service provider network from the second party, wherein the second code is between two (2) and seven (7) characters in length;

storing the first code in association with the first telephone number;

storing the second code in association with the second telephone number;

receiving a dialed code from a caller, wherein the dialed code is between two (2) and seven (7) characters in length;

if the dialed code consists of the first code, connecting the caller with the first telephone number;

if the dialed code consists of the second code, connecting the caller with the second telephone number; and rejecting the dialed code from the caller if the caller is not present in a predetermined geographic area using a blocking algorithm for determining the caller's location and comparing the caller's location to one or more predetermined geographic areas.

2. The method of claim 1, wherein the first code consists of alphanumeric characters.

3. The method of claim 1, wherein the first code comprises special characters.

4. The method of claim 1, wherein the second code consists of alphanumeric characters.

5. The method of claim 1, wherein the second code comprises special characters.

6. The method of claim 1, wherein storing the first code in association with the first telephone number comprises storing the first code in association with the first telephone number in a database.

7. The method of claim 1, wherein storing the second code in association with the second telephone number comprises storing the second code in association with the second telephone number in a database.

8. The method of claim 1, further comprising receiving an alert character from the caller.

9. The method of claim 1, further comprising receiving an alert code from the caller.

10. The method of claim 1, wherein rejecting the dialed code from the caller if the caller is not present in the predetermined geographic area comprises rejecting the dialed code from the caller if the caller is not present in one of a plurality of predetermined Local Access Transport Areas (LATAs).

11. The method of claim 1, wherein connecting the caller with the first telephone number comprises terminating a first telephone call to a first party associated with the first telephone number.

12. The method of claim 1, wherein connecting the caller with the second telephone number comprises terminating a second telephone call to a second party associated with the second telephone number.

13. A system operable for providing rapid telephone call capability to a plurality of callers, comprising:

means for receiving a request to associate a first code with a telephone number assigned to a first party at an element in a telephone service provider network from the first party, wherein the first code is between two (2) and seven (7) characters in length;

means for receiving a request to associate a second code with a telephone number assigned to a second party at an element in the telephone service provider network from the second party, wherein the second code is between two (2) and seven (7) characters in length;

a database operable for storing the first code in association with the first telephone number and the second code in association with the second telephone number;

a telephone service provider network operable for receiving a dialed code from a caller, wherein the dialed code is between two (2) and seven (7) characters in length; and a logic unit for executing an algorithm, the logic unit operable for connecting the caller with the first telephone number if the dialed code consists of the first code and connecting the caller with the second telephone number if the dialed code consists of the second code, wherein the logic unit is further operable for determining the caller's location, comparing the caller's location to one or more predetermined geographic areas and rejecting the dialed code from the caller if the caller is not present in the one or more predetermined geographic areas.

14. The system of claim 13, wherein the first code consists of alphanumeric characters.

15. The system of claim 13, wherein the first code comprises special characters.

16. The system of claim 13, wherein the second code consists of alphanumeric characters.

17. The system of claim 13, wherein the second code comprises special characters.

18. The system of claim 13, wherein the telephone network comprises a wireline telephone network.

19. The system of claim 13, wherein the telephone network comprises a wireless telephone network.

20. The system of claim 13, wherein the telephone network is further operable for transmitting an alert character from the caller.

21. The system of claim 13, wherein the telephone network is further operable for transmitting an alert code from the caller.

22. The system of claim 13, wherein the logic unit algorithm is further operable for rejecting the dialed code from the caller if the caller is not present in one of a plurality of predetermined Local Access Transport Areas (LATAs).

23. The system of claim 13, wherein the logic unit is further operable for terminating a first telephone call to a first party associated with the first telephone number.

24. The system of claim 13, wherein the logic unit algorithm is further operable for terminating a second telephone call to a second party associated with the second telephone number.

* * * * *